(12) United States Patent
Tang et al.

(10) Patent No.: US 8,346,417 B2
(45) Date of Patent: Jan. 1, 2013

(54) METHOD AND APPARATUS FOR CONTROLLING MOTOR FOR SKID MODE OF ELECTRIC VEHICLE

(75) Inventors: Xiaohua Tang, Guangdong (CN); Ming Yu, Shanghai (CN); Xuguang Zhou, Guangdong (CN); Jian Gong, Shanghai (CN); Nan Liu, Guangdong (CN); Guangming Yang, Guangdong (CN)

(73) Assignee: Byd Co. Ltd. (CN)

( * ) Notice: Subject to any disclaimer, the term of this patent is extended or adjusted under 35 U.S.C. 154(b) by 700 days.

(21) Appl. No.: 12/521,424

(22) PCT Filed: Dec. 25, 2007

(86) PCT No.: PCT/CN2007/071320
§ 371 (c)(1),
(2), (4) Date: Aug. 17, 2009

(87) PCT Pub. No.: WO2008/077350
PCT Pub. Date: Jul. 3, 2008

(65) Prior Publication Data
US 2010/0057284 A1    Mar. 4, 2010

(30) Foreign Application Priority Data

Dec. 26, 2006  (CN) .......................... 2006 1 0157734

(51) Int. Cl.
*B60L 15/20* (2006.01)
*B60L 3/10* (2006.01)
*B60L 9/18* (2006.01)

(52) U.S. Cl. ................ 701/22; 701/82; 318/52
(58) Field of Classification Search ................ None
See application file for complete search history.

(56) References Cited

U.S. PATENT DOCUMENTS

| 5,898,281 | A | 4/1999 | Bossoney et al. |
| 6,274,998 | B1 | 8/2001 | Kaneko et al. |
| 6,646,406 | B1 | 11/2003 | Pollock et al. |
| 2005/0284679 | A1 | 12/2005 | Hommi et al. |

FOREIGN PATENT DOCUMENTS

| CN | 1161916 A | 10/1997 |
| CN | 1681680 A | 10/2000 |
| CN | 1275947 A | 12/2000 |
| CN | 1778598 A | 5/2006 |
| JP | 1996251715 | 11/2003 |

OTHER PUBLICATIONS

International Search Report dated Mar. 12, 2008 issued in PCT/CN2007/071320.

*Primary Examiner* — Michael J. Zanelli
(74) *Attorney, Agent, or Firm* — Brinks Hofer Gilson & Lione

(57) ABSTRACT

The present invention discloses a method and apparatus for controlling a motor for an electric vehicle. The method and apparatus calculates the current acceleration α of the motor according to the detected rotor position values in real-time, and if the current acceleration α is greater than a predetermined forward acceleration α0, the output torque of the motor is decreased. If the acceleration α is less than a predetermined backward acceleration α1, then the output torque of the motor is decreased. Thus, when the vehicle travels from a normal road surface to a smooth road surface, the decrease or increase output torque may suppress the abrupt speed variations.

7 Claims, 4 Drawing Sheets

METHOD AND APPARATUS FOR CONTROLLING MOTOR FOR SKID MODE OF ELECTRIC VEHICLE

CROSS-REFERENCE TO RELATED APPLICATIONS

This application is a national phase application of PCT Application No. PCT/CN2007/071320, filed Dec. 25, 2007, which claims priority from Chinese Patent Application No. 2006-10157734.6, filed Dec. 26, 2006, both contents of which are incorporated herein by reference in their entirety.

FIELD OF TECHNOLOGY

This invention relates to motor control field of an electric vehicle, that is, relates to a method and apparatus for controlling motor for skid mode of an electric vehicle.

BACKGROUND

In the Chinese patent application CN1861443A titled "Method of Motor Control", it disclosed a method for controlling motor in background, which adopts the velocity ring control to fulfill the PI control for the rotary speed of motor rotor, then control the torque of motor through the quadrature current and d-axis current adjustment for motor. This invention provides a motor control method for electric vehicle, which predetermined the quadrature target current according to the angular velocity of motor and predetermined the d-axis target current according to the torque of motor; detect and collect the 3-phase current of motor, meanwhile, the rotary transformer may detect the rotor position of motor and the revolving decoding unit may measure the angle of rotor; convert the 3-phase current of motor into the actual d-axis current and quadrature current according to the Park conversion and Clark conversion of rotor position angle; take the difference between the target current and actual current as the input of current ring for PI adjustment to output the required d-axis current and required quadrature current; output the required d-axis current and required quadrature current according to PI adjustment and calculate the 3-phase voltage value according to the motor rotor angle; and obtain the pulse width modulation control waveform from the 3-phase voltage, convert the DC into relevant AC to drive the motor.

The above mentioned velocity ring feedback control or current ring feedback control are only the basis of motor control. During practices, for complex and varying road surface cases and modes, thus, the decision making must be combined with various parameters of vehicle, and the current service conditions of electric vehicle, with the special control mode, calculate the target d-axis current and quadrature current, and finally given through PI adjustment to prevent the motor out-of-control.

One of the modes of electric vehicle is the skid mode. For example, when the vehicle travels from a normal surface of road into a smooth surface, such as an icy surface with very low friction, the situation equals to the load of motor suddenly reduced, due to sudden unload, the rotor of motor accelerates, the generated surge current and voltage may cause the protection of intelligent power module (IPM), directly cause the motor out-of-control, which is unallowable during the normal travel. On the contrary, when the vehicle is on the smooth surface of road, the motor may only output very low torque to ensure the normal travel of vehicle, but when the vehicle travels from the smooth surface to a section with normal friction of road surface, i.e., the situation equals to suddenly apply a load on the motor, the sudden growth of load may cause the torque of motor suddenly reduced at very low output, and even stall. This case may cause the protection of motor controller, moreover, during extreme case, i.e. blocked rotor, all the electric power may be converted into the heat of motor winding, which may cause the winding overheated. Both cases mentioned above are generally called "skid mode". Under these cases, due to sudden increasing or decreasing of motor rotary speed, the out-of-control of motor may be caused.

There is no method or apparatus in the existing motor control strategys for controlling motor for electric vehicle aimed at the skid mode.

SUMMARY OF THE INVENTION

In order to avoid both cases of skid mentioned above, the present invention provides a control strategy for the skid mode, that is, provides a method and apparatus for controlling motor for electric vehicle, to ensure the safety and comfort of electric vehicle under skid modes.

In order to realize the purpose mentioned above, the present invention provides a method for controlling a motor for an electric vehicle, comprising the following steps:

S1) detecting rotor positions of the motor in a sampling period;

S2) calculating a current acceleration a of the motor according to the detected rotor position values within a specified statistical duration;

S3) comparing the calculated current acceleration a with a predetermined forward acceleration a and a predetermined backward acceleration a1 respectively, and going to step S4 if the current acceleration a is greater than the predetermined forward acceleration a0 or is less than the predetermined backward acceleration a1, otherwise controlling output torque of the motor according to normal travel control strategy; and S4) decreasing output torque of the motor if the current acceleration a is greater than the predetermined forward acceleration a0, or increasing output torque of the motor if the current acceleration a is less than the predetermined backward acceleration a1, and then returning to step S1.

Moreover, the present invention further provides a system for controlling a motor for an electric vehicle, comprising a rotor position detection unit and a motor controller, the rotor position detection unit is connected with the motor controller, the rotor position detection unit is for detecting rotor positions in a sampling period and outputting the detected rotor position values to the motor controller; wherein, the motor controller comprises a mode determination module and a skid control module The mode determination module is configured to calculate a current acceleration a of the motor according to the received rotor position values within a specified statistical duration; compare the calculated current acceleration a with a predetermined forward acceleration a0 and a predetermined backward acceleration a1 respectively, and active the skid control module if the current acceleration a is greater than the predetermined forward acceleration a0 or is less than the predetermined backward acceleration a1.

The skid control module is configured to output a motor control signal for decreasing output torque if the current acceleration a is greater than the predetermined forward acceleration a0, or output a motor control signal for increasing output torque if the current acceleration a is less than the predetermined backward acceleration a1 in the situation of activation.

In the present invention, the control strategy for skid mode is provided. When the vehicle travels from the normal surface of road into a smooth road surface or on the contrary, the speed of drive wheel may be jumped, i.e., the rotary speed of motor shall be greatly increased or decreased beyond the threshold value, just then the motor shall operate under the skid control mode, according to the method specified in the present invention, decreasing or increasing output torques may suppress the abrupt varying of vehicle speed, and according to that specified in the preferred embodiment, firstly reducing output torque during early period may suppress the current abrupt varying, protect the power device, in order to avoid the vehicle out-of-control caused by blocked rotor or skid of motor, thus improve the vehicle's safety and comfort.

DETAILED DESCRIPTION OF THE PREFERRED EMBODIMENTS

This invention is further described as below through the detailed embodiment and combined with the attached figures.

The system for controlling a motor provided in the present invention comprises a rotor position detection unit and a motor controller 4, the rotor position detection unit is connected with the motor controller 4, the rotor position detection unit is for detecting rotor positions with a sampling period and outputting the detected rotor position values to the motor controller 4; wherein the motor controller 4 may output a motor control signal corresponding to the rotor position value.

Figure 1:
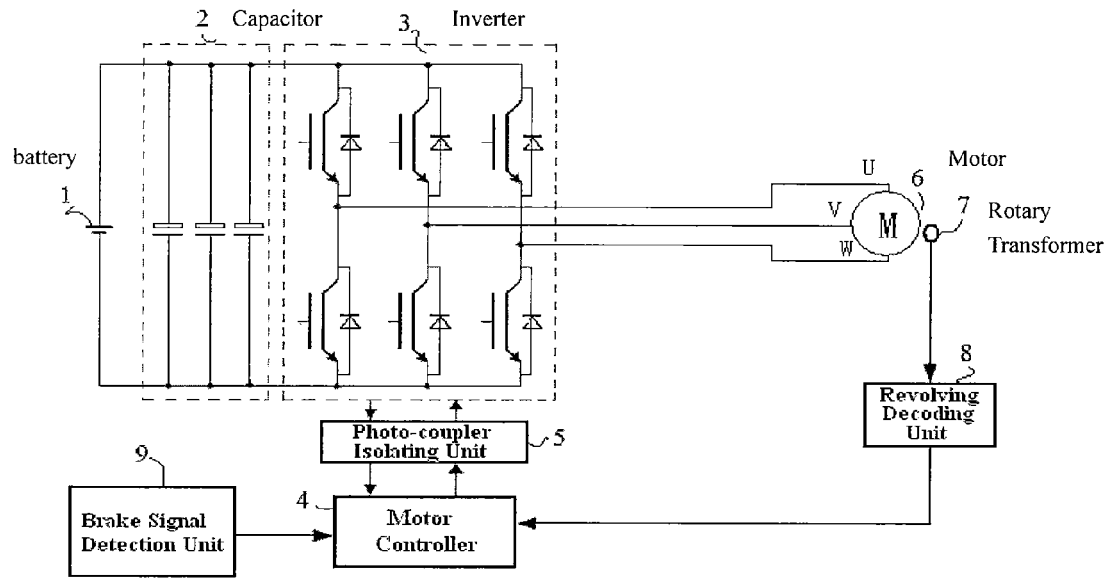
FIG. 1 is a structural view of an electrical drive system for electric vehicle applied to the apparatus for controlling motor according to the present invention.

Referred to FIG. 1, said motor control system is described as below. FIG. 1 is a structural view of electrical drive system for the electric vehicle, this system comprises: a battery set 1, a set of capacitor 2, an inverter 3, the motor controller 4, a photo-coupler isolating unit 5, the motor 6, a rotary transformer 7, a revolving decoding unit 8 and a brake signal detection unit 9.

Wherein the battery set 1 is the energy source for the whole electric drive system; both the positive and negative poles of the set of capacitor 2 are respectively connected with the positive and negative poles of the battery set 1 for absorbing the high frequency impact voltage and smoothing the voltage waveform; the inverter 3 comprises three intelligent power modules (IPM) (the power devices such as IGBT, transistor etc may be also used), each IPM is divided into a upper bridge arm and a lower bridge arm, the input terminals of upper bridge arms for three IPMs are connected with the positive bus of the battery set 1, the lower bridge arms are connected with the negative bus of the battery set 1, all contact points among IPMs are respectively connected with 3-phase coils (U phase, V phase, and W phase) of the motor 6.

The motor controller 4 outputs motor control signals, i.e. PWM signals, to the inverter 3 through the photo-coupler isolating unit 5, and the inverter 3 may adjust ON/OFF of the upper and lower bridge arms of each IPM according to the motor control signals to control the rotary speed of motor 6, i.e., the output torques of control motor 6.

The rotor position detection unit of the present invention may be a sensor unit suitable for detecting the rotor positions. Shown as FIG. 1, in the embodiment, the rotor position detection unit comprises a rotary transformer 7 and a revolving decoding unit 8, an output terminal of the rotary transformer 7 is connected with an input terminal of the revolving decoding unit 8, an output terminal of the revolving decoding unit 8 is connected with an input terminal of the motor controller 4. The rotary transformer 7 locates nearby the rotor of the motor 6 for collecting the rotor angle position signals in a sampling period and outputting the rotor angle position signals to the revolving decoding unit 8, and the revolving decoding unit 8 may calculate rotor position values based on the received rotor angle position signals and output the rotor position values to the motor controller 4. The range of the sampling period is 10-100 μs.

Wherein, apart from the skid control module for skid mode, the motor controller 4 further comprises a normal travel control module and a brake control module which are necessary for the vehicle. See FIG. 2, it shows the activation conditions of these modules, i.e., the working flow of the mode determination module.

Figure 2:
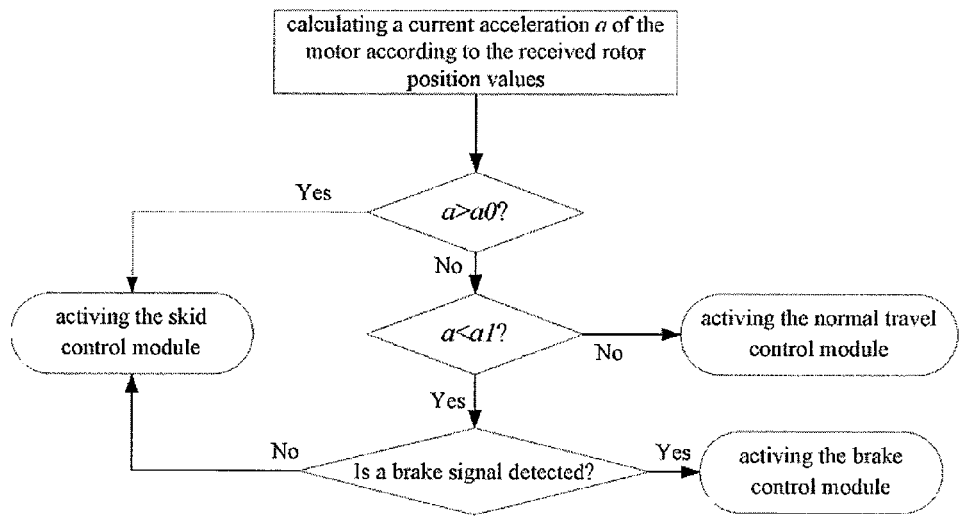
FIG. 2 is a working flow chart of the mode determination module according to the present invention.

Shown as FIG. 2, firstly, according to the received rotor position values within a specified statistical duration, the mode determination module may calculate the current acceleration a of the motor. The rotor position values are provided by the revolving decoding unit 8 mentioned above, the rotor speed may be calculated according to rotor position values, and the current acceleration a may be calculated according to rotor speed values. This acceleration may be positive or negative, the positive value indicates the acceleration, and negative value indicates the deceleration. In which, the range of the specified statistical duration is 3-10 sampling periods.

Then the mode determination module may compare the calculated current acceleration a with a predetermined forward acceleration a0 and a predetermined backward acceleration a1 respectively. Wherein the predetermined forward acceleration a0 and the predetermined backward acceleration a1 are the maximum forward acceleration and the maximum backward acceleration of the motor 6 specified according to the mass of the whole vehicle and the power of motor 6, its value depends on the vehicle models. When the motor 6 is a specified motor, the maximum forward acceleration and maximum backward acceleration are the maximum rotor forward rotary or backward rotary acceleration of rotor within a sampling period of revolving decoding unit 8 caused by this motor 6 under its maximum output power. In which, the predetermined forward acceleration a0 is a positive value, and the predetermined backward acceleration a1 is a negative value, the absolute values of the two values may be equal or unequal.

If the current acceleration a is greater than the predetermined forward acceleration a0 or is less than the predetermined backward acceleration a1, the skid control module is actived; and if the current acceleration a is between the predetermined forward acceleration a0 and the predetermined backward acceleration a1, the normal travel control module is actived.

Apart from the skid mode may cause the situation that the current acceleration a is less than the predetermined backward acceleration a1, the situation may be also caused by the initiative braking of driver, thus, under this case, the brake control strategy should be preferred, but not the activation of skid control strategy. Thus, shown as FIG. 1, the apparatus provided in the present invention further comprises the brake signal detection unit 9 for detecting a brake signal and outputting the detected brake signal to the motor controller 4, the brake signal detection unit 9 may be a brake signal sensor, for detecting the pedal position of brake.

Shown as FIG. 2, the mode determination module is further configured to determine whether or not the brake signal detection unit (9) detects a brake signal if the calculated current acceleration a is less than predetermined backward acceleration a1, and active the skid control module when no brake signal is detected, otherwise active the brake control module when a brake signal is detected.

Figure 3:
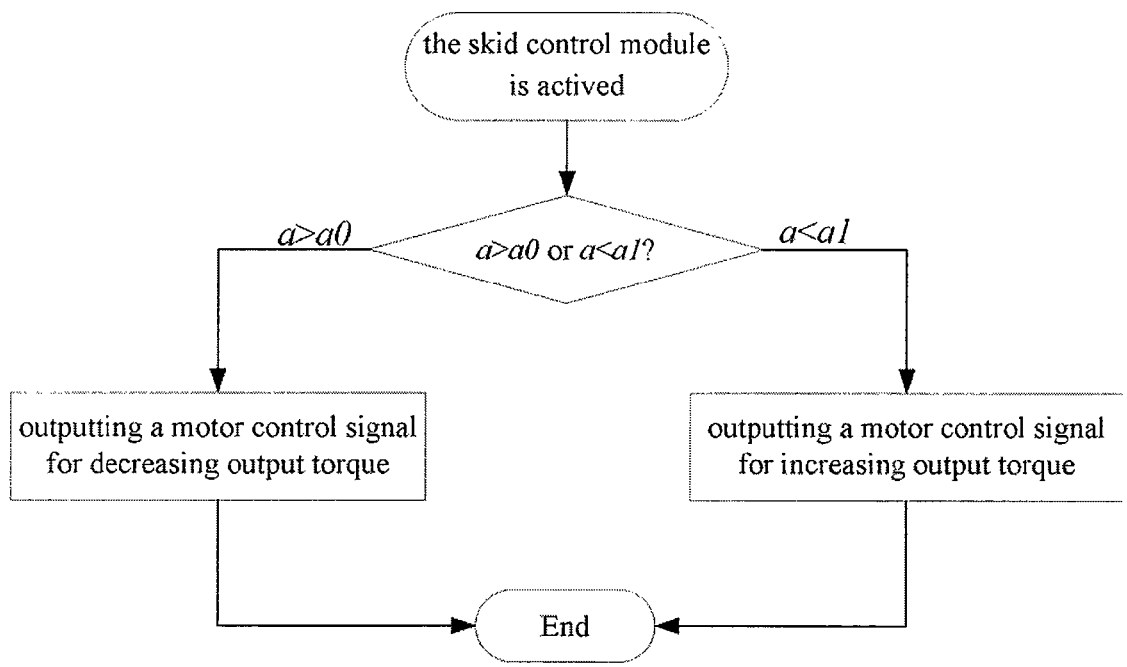
FIG. 3 is a working flow chart of the skid control module according to the present invention.

When the skid control module is actived, it shall be configured to execute the working flow shown as FIG. 3. In FIG. 3, if the current acceleration a is greater than the predetermined forward acceleration a0, outputting a motor control signal for decreasing output torque, if the current acceleration a is less than the predetermined backward acceleration a1, outputting a motor control signal for increasing output torque.

Wherein the increased and decreased range shall be controlled by the skid control module, it may be a specified value or a function value concerned with the current acceleration a, but its increased or decreased value can't be beyond the tolerated value of the motor 6.

Thus, through the working flow shown as FIG. 3 executed by skid control module, the sudden increase or decrease of motor rotary speed may be controlled reversely to solve the skid modes with the load suddenly increase or suddenly decrease, thus avoid the rotor of the motor blocked or vehicle out-of-control caused by skid, and improve the vehicle's safety and comfort.

Moreover, the sudden load and unload of vehicle caused by skid cases may cause the current surge, thus, in the present invention, the apparatus further comprises the embodiment for suppressing the current surge, in this embodiment, after the skid control module is actived, if the current acceleration a is greater than the predetermined forward acceleration a0 or is less than the predetermined backward acceleration a1, then firstly outputting a motor control signal for decreasing output torque before outputting the motor control signals for decreasing or increasing output torque, thus the current via the motor may be restricted, the instantaneous abrupt varying of current may be suppressed, which further protect the power devices from the aspect of hardware. After the abrupt varying of current is suppressed, then outputting said motor control signal for decreasing or increasing output torques according to the mentioned skid control strategy.

The control strategy for the mentioned normal travel control module and brake control module may adopt various control solutions for normal travel and brake, no influences to the skid control strategy of the present invention, thus no further description given.

Combined with FIG. 4 and FIG. 5, the motor control method in the present invention is described below.

Figure 4:
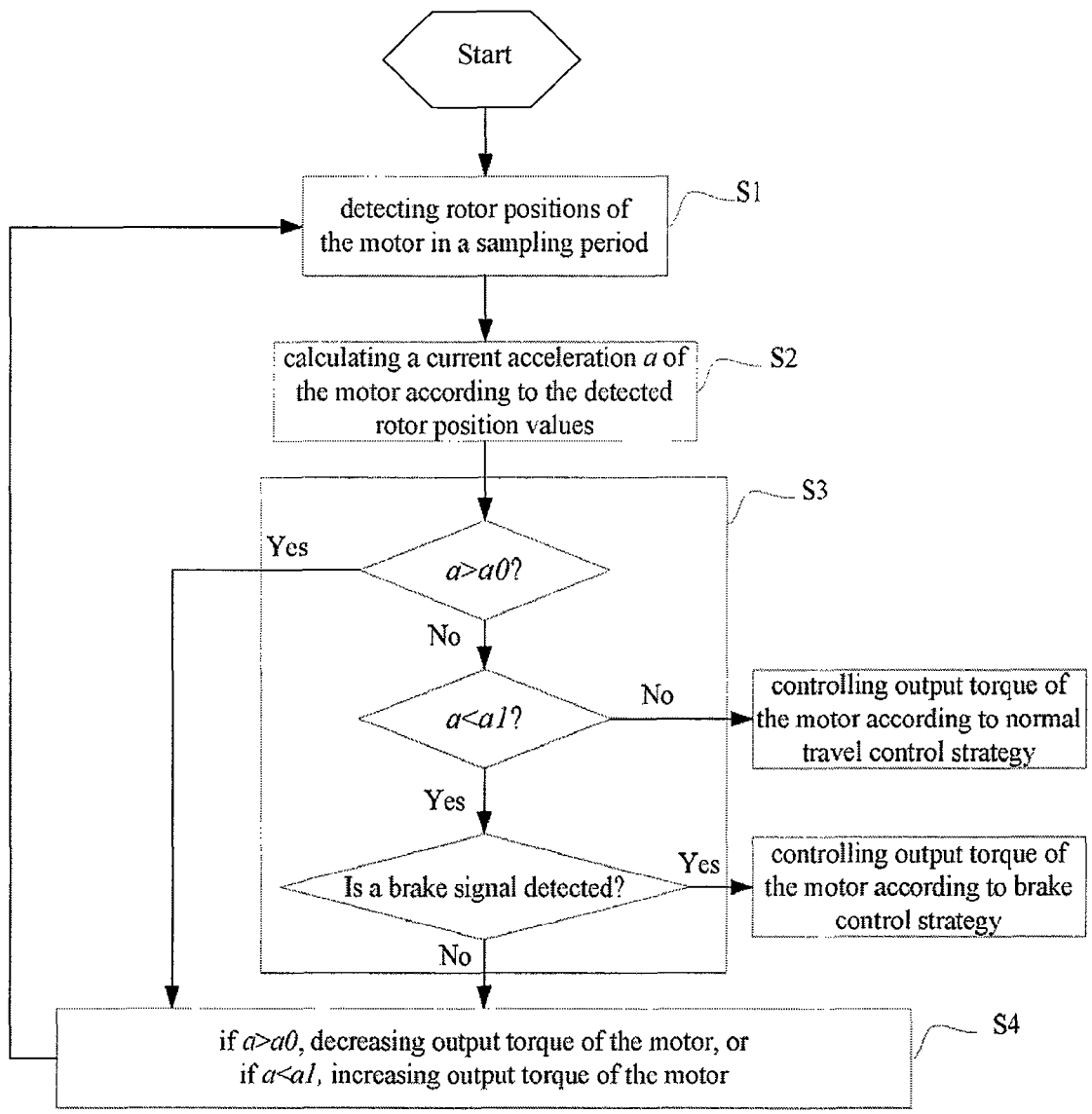
FIG. 4 is a flow chart of the method for controlling motor according to the present invention.

Shown as FIG. 4, the method comprises the following steps: in step S1, detecting rotor positions of the motor in a sampling period. In step S2, calculating a current acceleration a of motor according to the detected rotor position values within a specified statistical duration. In step S3, comparing the calculated current acceleration a with a predetermined forward acceleration a0 and a predetermined backward acceleration a1 respectively, and going to step S4 if the current acceleration a is greater than the predetermined forward acceleration a0 or is less than the predetermined backward acceleration a1, otherwise controlling output torque of the motor according to normal travel control strategy. In step S4, if the current acceleration a is greater than the predetermined forward acceleration a0, then decreasing output torque of the motor, and if the current acceleration a is less than the predetermined backward acceleration a1, then increasing output torque of the motor, and then returning to step S1.

The step S1 is executed by the rotor position detection unit, as comprising the described rotary transformer 7 and the revolving decoding unit 8, in which, the range of the sampling period is 10-100 μs. The step S2 and S3 are executed by the mode determination module in the mentioned motor controller 4, and the step S4 is executed by the skid control module in the mentioned motor controller 4, both execution processes are described as above, no further description hereon. In which, the range of the specified statistical duration in step S2 is 3-10 sampling periods. And the increase and decrease range in step S4 may be controlled by the skid control module control, it may be a specified value or a function value concerned with the current acceleration a, its increase or decrease range shall be not beyond the tolerated value of the motor 6.

In which, considering the situation of the initiative braking of driver, the preferred step is also provided, that is, if the current acceleration a is less than predetermined backward acceleration a1 in step S3, determination whether there is brake signal or not just then at first, if there is no brake signal, going to step S4, otherwise, controling output torque of the motor according to brake control strategy.

Figure 5:
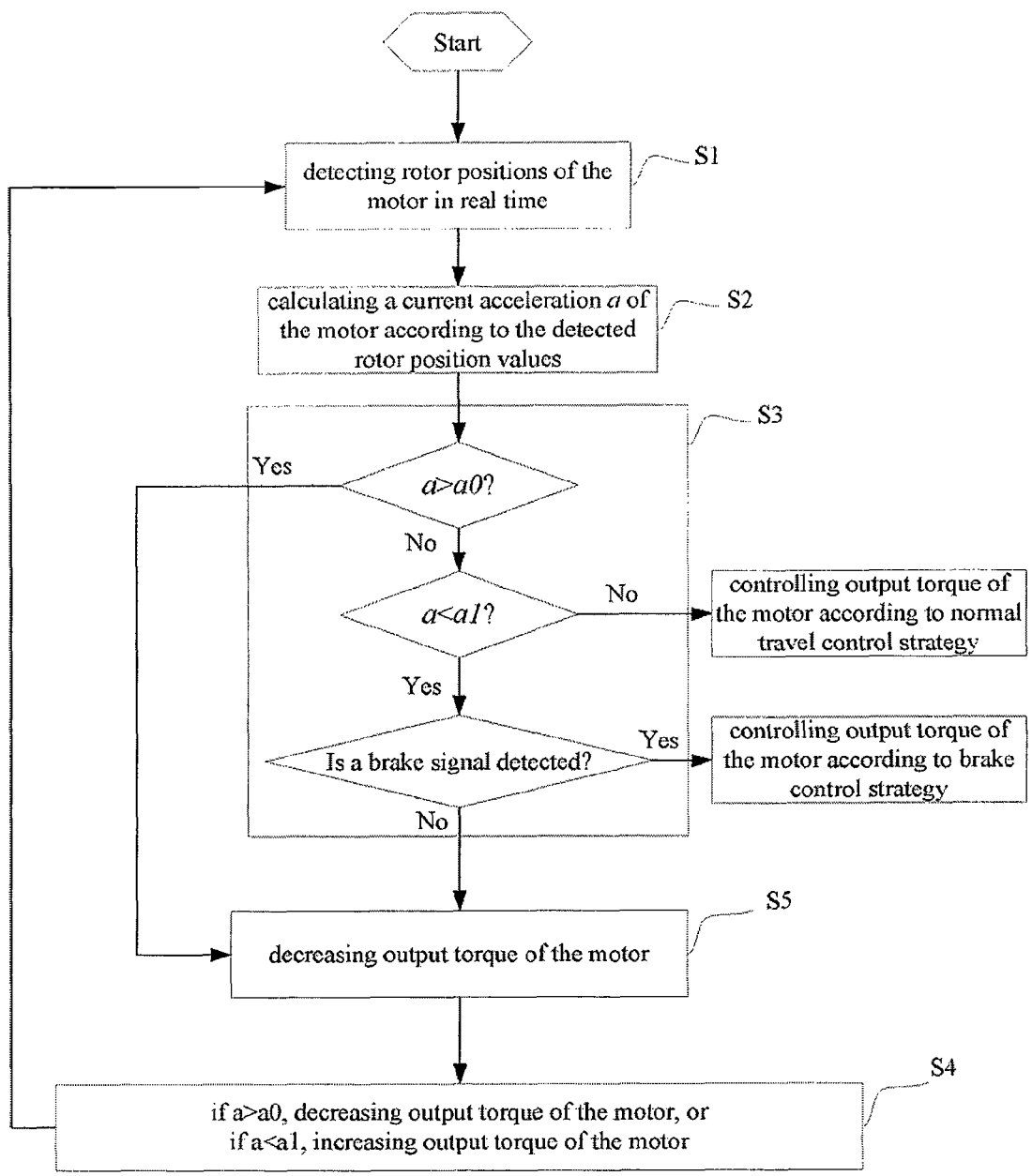
FIG. 5 is a flow chart of the method for controlling motor according to a preferred embodiment of the present invention.

Moreover, the method in the present invention also provides an embodiment for suppressing the current surge, shown as FIG. 5, in this embodiment, if the current acceleration a is greater than the predetermined forward acceleration a0 or is less than predetermined backward acceleration a1 in step S3, then firstly decreasing output torque of the motor in step S5 before executing step S4, thus the current of motor may be suppressed, and the instantaneous abrupt varying of current may be decreased to protect the power device. After the abrupt varying of current is suppressed, the output torque of motor may be increased or decreased in step S4 according to the introduced skid control strategy.

The predetermined forward acceleration a0 and predetermined backward acceleration a1 are the maximum forward acceleration and the maximum backward acceleration of the motor 6 specified according to the mass of the whole vehicle and the power of the motor 6, its value depends on the vehicle models. When the motor 6 is a specified motor, the maximum forward acceleration and maximum backward acceleration are the maximum rotor forward rotary or backward rotary acceleration of rotor within a sampling period of revolving decoding unit 8 caused by this motor 6 under its maximum output power. Wherein the predetermined forward acceleration a0 is a positive value, the predetermined backward acceleration a1 is a negative value, and the absolute values of both may be equal or unequal.

The control strategy for the mentioned normal travel control module and brake control module may adopt various control solutions for normal travel and brake, no influences to the skid control strategy of the present invention, thus no further description given.

We claim:

1. A method for controlling a motor for an electric vehicle, comprising the steps of:
    S1) detecting rotor positions of the motor during a sampling period;
    S2) calculating a current acceleration (a) of the motor based on the detected rotor position values within a specified statistical duration;
    S3) if the current acceleration (a) is greater than a predetermined forward acceleration ($a_0$), then decreasing an output torque of the motor, and performing step S1;

S4) if the current acceleration (a) is not greater than a predetermined forward acceleration ($a_0$) and if the current acceleration (a) is less than a predetermined backward acceleration ($a_1$), then increasing the output torque of the motor, and performing step S1; and S5) if the current acceleration (a) is not greater than the predetermined forward acceleration ($a_0$) and if the current acceleration (a) is not less than the predetermined backward acceleration ($a_1$), then controlling the output torque of the motor according to a normal travel control strategy; and wherein if the current acceleration (a) is less than the predetermined backward acceleration (a1) in step S4 and if a brake signal is detected, then controlling the output torque of the motor according to a brake control strategy.

2. The method of claim 1, wherein the predetermined forward acceleration ($a_0$) and the predetermined backward acceleration ($a_1$) correspond respectively to a maximum forward acceleration and a maximum backward acceleration based on a mass of the vehicle and a motor power.

3. An apparatus for controlling a motor for an electric vehicle, comprising:
a rotor position detection unit;
a motor controller coupled to the rotor position detection unit;
the rotor position detection unit configured to determine rotor positions during a sampling period and output the detected rotor position values to the motor controller;
the motor controller including a mode determination module and a skid control module;
the mode determination module configured to:
calculate a current acceleration (a) of the motor based on the rotor position values obtained within a specified statistical duration;
compare the current acceleration (a) with a predetermined forward acceleration ($a_0$) and a predetermined backward acceleration ($a_1$); and
activate the skid control module if the current acceleration (a) is greater than the predetermined forward acceleration ($a_0$) or if the current acceleration (a) is less than the predetermined backward acceleration ($a_1$);
a skid control module configured to:
output a motor control signal configured to decrease an output torque of the motor if the current acceleration (a) is greater than the predetermined forward acceleration ($a_0$); and
output a motor control signal configured to increase an output torque of the motor if the current acceleration (a) is less than the predetermined backward acceleration ($a_1$); and
the rotor position detection unit further comprising:
a rotary transformer having a transformer output terminal,
a revolving decoding unit having an decoding input terminal and a decoding output terminal;
the transformer output terminal connected to the decoding input terminal, and the decoding output terminal connected to an input terminal of the motor controller;
the rotary transformer configured to obtain the rotor angle position signals and output the rotor angle position signals to the revolving decoding unit; and
the revolving decoding unit configured to calculate the rotor position values based on the rotor angle position signals, and output the rotor position values to the motor controller.

4. The apparatus as claimed in claim 3, wherein the motor controller further comprises a normal travel control module, wherein the mode determination module is configured to activate the normal travel control module if the calculated current acceleration (a) ranges between the predetermined forward acceleration ($a_0$) and the predetermined backward acceleration ($a_1$).

5. The apparatus of claim 3, wherein the skid control module is activated if the current acceleration (a) is greater than the predetermined forward acceleration ($a_0$) or is less than the predetermined backward acceleration ($a_1$);
the skid control module outputs a motor control signal configured to decrease an output torque before outputting the motor control signal.

6. An apparatus for controlling a motor for an electric vehicle, comprising:
a rotor position detection unit;
a motor controller coupled to the rotor position detection, and further including a brake control module;
the rotor position detection unit configured to determine rotor positions during a sampling period and output the detected rotor position values to the motor controller;
the motor controller including a mode determination module and a skid control module;
the mode determination module configured to:
calculate a current acceleration (a) of the motor based on the rotor position values obtained within a specified statistical duration;
compare the current acceleration (a) with a predetermined forward acceleration ($a_0$) and a predetermined backward acceleration ($a_1$): and
activate the skid control module if the current acceleration (a) is greater than the predetermined forward acceleration ($a_0$) or if the current acceleration (a) is less than the predetermined backward acceleration ($a_1$);
a skid control module configured to:
output a motor control signal configured to decrease an output torque of the motor if the current acceleration (a) is greater than the predetermined forward acceleration ($a_0$); and
output a motor control signal configured to increase an output torque of the motor if the current acceleration (a) is less than the predetermined backward acceleration ($a_1$);
a brake signal detection unit configured to detect a brake signal and output the brake signal to the motor controller;
the mode determination module configured to:
determine if the brake signal detection unit detected a brake signal and determine if the calculated current acceleration (a) is less than predetermined backward acceleration ($a_1$); and
activate the skid control module when no brake signal is detected, and active the brake control module when a brake signal is detected.

7. A computer readable memory encoded with data representing a computer program for system for controlling a motor for skid mode in an electric vehicle, the computer readable memory causing a computer to perform the acts of:
S1) detecting rotor positions of the motor during a sampling period;
S2) calculating a current acceleration (a) of the motor based on the detected rotor position values within a specified statistical duration;

S3) if the current acceleration (a) is greater than a predetermined forward acceleration ($a_0$), then decreasing an output torque of the motor, and performing step S1;
S4) if the current acceleration (a) is not greater than a predetermined forward acceleration ($a_0$) and if the current acceleration (a) is less than a predetermined backward acceleration ($a_1$), then increasing the output torque of the motor, and performing step S1; and
S5) if the current acceleration (a) is not greater than the predetermined forward acceleration ($a_0$) and if the current acceleration (a) is not less than the predetermined backward acceleration ($a_1$), then controlling the output torque of the motor according to a normal travel control strategy;
wherein the output torque of the motor is controlled according to a brake control strategy if the current acceleration (a) is less than the predetermined backward acceleration (a1) step S4 and if a brake signal is detected.

* * * * *